United States Patent [19]
Awad

[11] 3,893,926
[45] July 8, 1975

[54] MEMBRANE FLUID DIFFUSION EXCHANGE DEVICE

[76] Inventor: John A. Awad, 632 Charron, Ste-Foy, Quebec, Canada

[22] Filed: July 24, 1973

[21] Appl. No.: 382,110

[52] U.S. Cl. ........... 210/321; 23/258.5; 128/DIG. 3
[51] Int. Cl. ...................... A61m 1/03; B01d 13/00
[58] Field of Search.................... 23/258.5; 210/321; 128/DIG. 3

[56] References Cited
UNITED STATES PATENTS

| | | | |
|---|---|---|---|
| 2,411,238 | 11/1946 | Zender | 210/321 UX |
| 2,972,349 | 2/1961 | DeWall | 23/258.5 |
| 3,228,876 | 1/1966 | Mahon | 23/258.5 X |
| 3,333,583 | 8/1967 | Bodell | 210/321 X |
| 3,373,876 | 3/1968 | Stewart | 23/258.5 X |
| 3,505,686 | 4/1970 | Bodell | 23/258.5 X |
| 3,506,406 | 4/1970 | Birch | 23/258.5 |
| 3,579,810 | 5/1971 | Mon | 23/258.5 X |
| 3,583,907 | 6/1971 | Borsanyi | 210/321 X |
| 3,794,468 | 2/1974 | Leonard | 23/258.5 |

Primary Examiner—Barry S. Richman
Attorney, Agent, or Firm—Cushman, Darby and Cushman

[57] ABSTRACT

The device includes: a housing defining a closed chamber therein; a plurality of tubular silastic membranes extending through the chamber; first inlet and outlet means opening in the chamber for circulating oxygen therein around the tubular membranes; second inlet and outlet means opening in the housing for circulating in the tubular membranes blood to be oxygenated; a plurality of capillary silastic membranes disposed in each of the tubular membranes; and third inlet and outlet means opening in the housing for circulating oxygen in the capillary membranes whereby oxygen diffuses through the walls of the tubular membranes and of the capillary membranes to contact the blood circulating in countercurrent flow in the tubular membranes.

12 Claims, 3 Drawing Figures

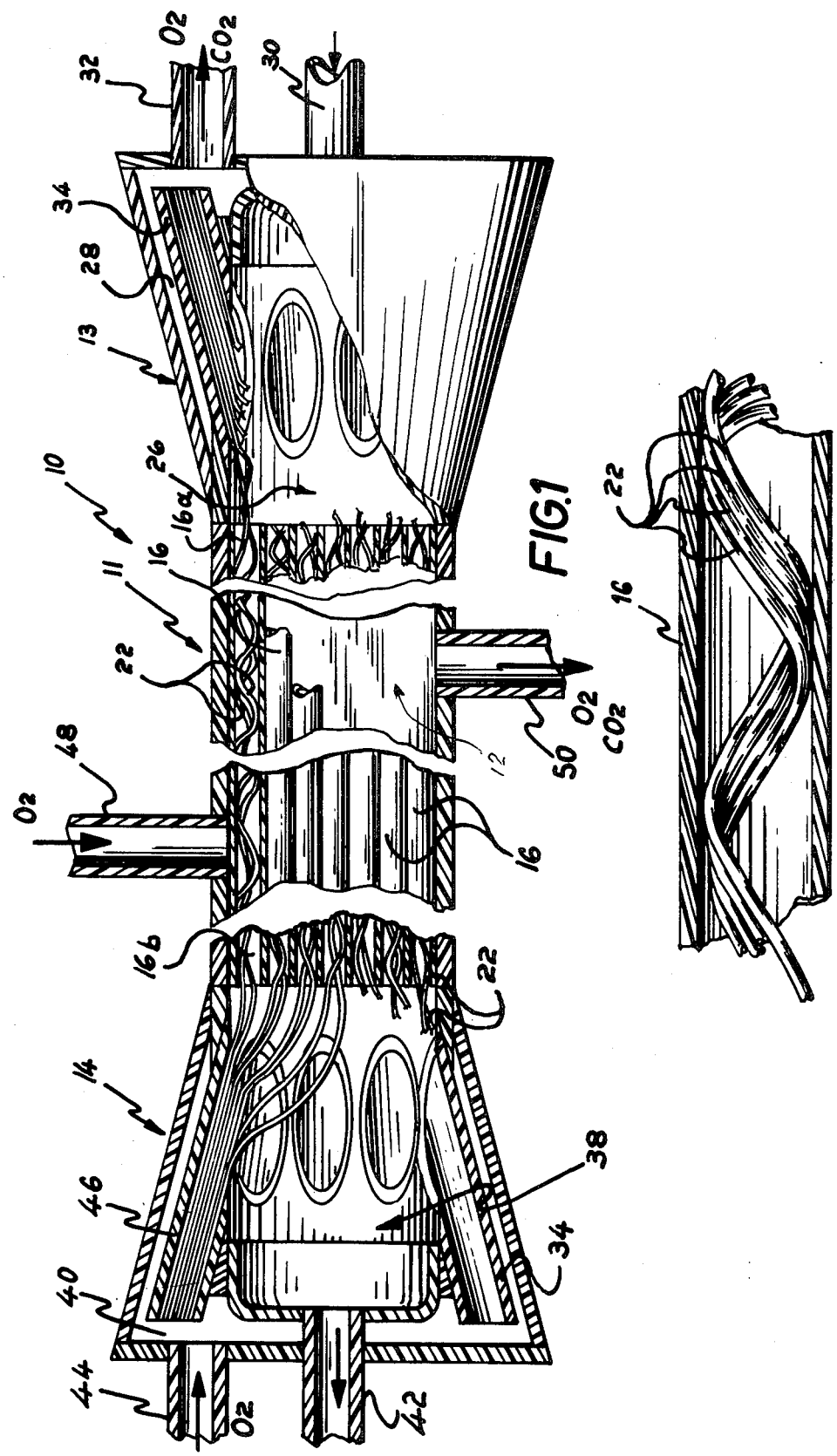

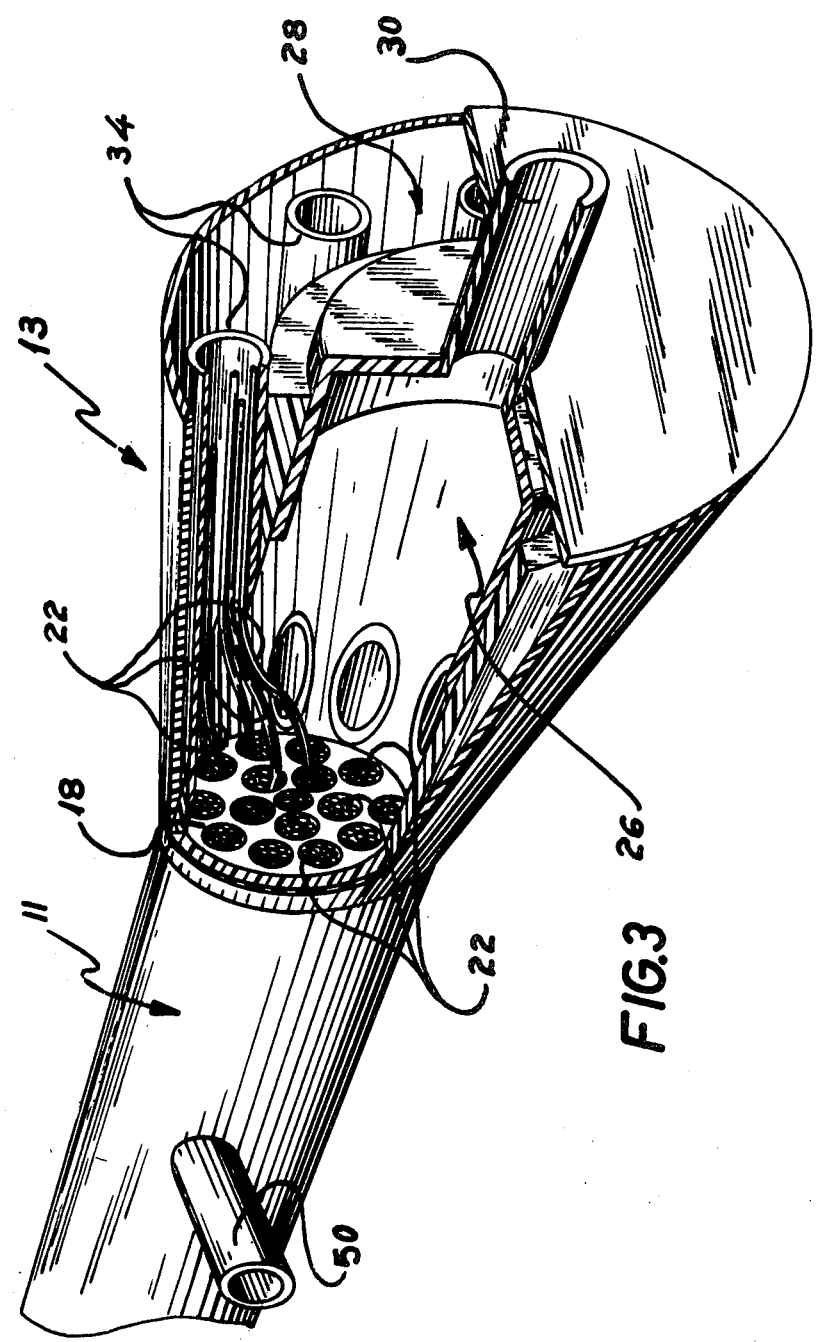

MEMBRANE FLUID DIFFUSION EXCHANGE DEVICE

FIELD OF THE INVENTION

The present invention relates to a membrane fluid diffusion exchange device; more particularly, the invention pertains to an apparatus for oxygenating blood.

BACKGROUND OF THE INVENTION

In recent years, many attempts have been made to simulate the natural lung and kidney.

There has been a great development in artificial devices for extracorporeal circulation of a fluid to relieve it of carbon dioxide and to increase its oxygen content. Yet, there is still a field for improvement since many patients die each year. It is therefore urgent and imperative that new ways be explored if survival of these lives is to be improved.

It is evident to realize that the construction of a device which is susceptible to replace a human lung, for example, represents an enormous endeavour since the human lung oxygenates from 4 to 50 litres of blood depending on the activity of an individual; in other words, between 250 to 5000 ml of oxygen must be absorbed and substantially the same quantity of $CO_2$ must be extracted per minute. There are many technical and biological problems involved in providing a device which will temporarily assume or assist the functions of the heart and lungs of a human being.

One of these problems consists in the introduction of a diffusing membrane between blood and oxygen. Although some commercially available membranes are extremely permeable, their presence still result in a device which has considerable less efficiency when compared to a human or animal lung. Although enormous progress has been achieved in the development of membranes (dimethylpolysiloxane, siloxane polycarbonate) the gas still diffuses in an unsatisfactory manner, especially carbon dioxide. Furthermore, in the lung, each blood cell passes through a capillary having a diameter slightly greater than that of the blood cell. Comparatively, in all artificial devices, the blood film has a relatively considerable thickness. If blood flow is laminar, oxygenation becomes mediocre. Once oxygenated, the outer layer of the blood in contact with the inner wall of the membranes offers a resistance to the oxygenation of the rest of the blood flow. Many methods have been devised for solving this problem. In most cases, mixing or shaking is created to break the outer layer. Since this resistance is relatively high, most artificial devices require the assistance of a pump in order to insure a sufficient blood flow in the lung. Furthermore, the devices which use the shaking method to break the center layer have been observed to also break some blood cells.

STATEMENT OF THE INVENTION

One of the objects of the present invention is to provide a device for oxygenating a fluid in which the transfer of oxygen to the fluid and the removal of $CO_2$ therefrom are substantially increased and improved.

It is another object of the present invention to provide an oxygenating device where the total permeable surface area in relation to the priming fluid volume is increased thereby influencing the overall efficiency.

It is a further object of the invention to provide a novel and improved blood oxygenator which avoids agitation of the blood thereby causing little or no injury to the blood.

Accordingly, this invention provides a membrane fluid diffusion exchange device which comprises: a housing defining a closed chamber therein; a plurality of tubular diffusing membranes extending through the chamber; first inlet and outlet means opening in the chamber for circulating a treating fluid therein over the tubular membranes; second inlet and outlet means opening in the housing for circulating in the tubular membranes a fluid to be treated; a plurality of capillary diffusing membranes disposed in each of the tubular membranes; and third inlet and outlet means opening in the housing for circulating a similar treating fluid in the capillary membranes, said treating fluid diffusing through the walls of the tubular membranes and of the capillary membranes to treat said fluid circulating in the tubular membranes.

In one preferred form of the invention, the device operates as a blood oxygenator wherein blood is passed through the tubular membranes and oxygen is passed through the capillary membranes and in the closed chamber. The capillary membranes extend spirally inside the tubular membranes thereby creating a mixing in the tubular membranes which prevents the formation of an insulating laminar flow of blood to the inner walls of the tubular membranes while providing also increased contact area between the oxygen in the capillary membranes and the blood in the tubular membranes.

BRIEF DESCRIPTION OF THE DRAWINGS

Other objects, purposes and characteristic features of the present invention will be, in part, obvious from the accompanying drawings and, in part, pointed out as the description of the invention progresses. In describing the invention in detail, reference will be made to the accompanying drawings, in which:

FIG. 1 is an elevational sectioned view, of a fluid diffusion exchange device embodying the present invention;

FIG. 2 is an enlarged view of a tubular membrane with the cross-section of a few capillary membranes therein; and FIG. 3 is an enlarged perspective end view, partly broken away, of the device.

DESCRIPTION OF PREFERRED EMBODIMENT

Referring to FIGS. 1–3 of the drawings, the membrane fluid diffusion exchange device 10 includes an elongated hollow housing made of a resistant material, such as acrylic resin. The housing consists of a cylindrical central body 11, defining a closed chamber 12 therein, and two cone-shaped end portions 13 and 14 integrally mounted to the central body.

A plurality of identical tubular diffusing membranes 16 extend longitudinally through the chamber 12 from end portion 13 to end portion 14; the opposite ends 16a, 16b of each tubular membrane are received and secured together by means of a semi-rigid plastic casting or potting to form a pair of liquid-tight collars (one of which is shown as 18 in FIG. 3) at opposite ends of the central body 11. The material of which the tubular membranes 16 are made must be permeable to the transmission of both oxygen and carbon dioxide; examples of such a material include silicone rubber (known as silastic), polyvinyl chloride, polyethylene, etc. It will be evident to the man versed in the plastic art to provide other synthetic resilient semi-permeable materials which are pure, non-toxic, strong and capable of being sterilized. Therefore, although preference is hereby made to silastic membranes, it will be evident that this material may be substituted for some other semi-permeable or micro-porous equivalent.

A plurality of capillary diffusing membranes 22 extend through each of the tubular membranes 16. The material of these capillary membranes may be the same as that used in the making of the tubular diffusing membranes 16 and the discussion above concerning other material equivalents also applies for the material of the capillary membranes.

End portion 13 represents a first manifold, in the vicinity of ends 16a of the tubular membranes, which includes a centrally disposed fluid inlet chamber 26 and an annularly disposed oxygen outlet chamber 28. Chamber 26 includes an inlet connection 30 for receiving blood (in the case where the device 10 is used as a blood oxygenator) from an artery of a human being or animals. An outlet tube line 32 is connected to chamber 28. Extending around the central chamber 26, a series of tubular connections 34 receive the extremities of capillary membranes 22 for allowing oxygen and carbon dioxide to pass in chamber 28 to the outlet line 32.

End portion 14 of the housing also represents a second manifold in the vicinity of ends 16b, which manifold includes a centrally disposed oxygenated fluid outlet chamber 38 and an annularly disposed oxygen inlet chamber 40. Chamber 38 includes a oxygenated blood conduit line 42 for conducting the blood received in chamber 38 and returning it to a vessel of the patient. Similarly, an inlet conduit line 44 connects the oxygen chamber 40 to an outside source (not shown), which may be a tank containing oxygen under pressure. Extending around chamber 38, a series of tubular connections 46 receive the extremities of capillary tubes 22 for allowing oxygen in chamber 40 to circulate through the capillary membranes.

An inlet 48 opening in chamber 12 at one end thereof allows direct circulation of oxygen in the chamber 12 around the tubular membranes 16 while an outlet 50, at the other end thereof, enables the removal of oxygen and carbon dioxide. The direction of oxygen flow from inlet 48 to outlet 50 should be the same as that of the oxygen flow in the capillary membranes and in countercurrent to the blood flow in the tubular membranes.

OPERATION OF THE DEVICE

The operation will be described in relation to a blood oxygenator. Blood is received from a vessel through line 30 into chamber 26 and is then introduced in each of the tubular membranes 16 flowing in the direction from right to left as shown in FIG. 1. Simultaneously, oxygen or a mixture of oxygen with other gases is received from inlet 44 through chamber 40 and, subsequently, in each of the capillary tubes provided in the tubular connections 46. Additionally, oxygen or the above mentioned mixture is introduced via inlet 48 and circulates around the tubular membranes 16. The direction of oxygen is from left to right as seen in FIG. 1, and in countercurrent to the blood flow. The blood circulating from chamber 26 through tubular membranes 16 and to outlet chamber 38 absorbs oxygen through the membranes and discharges carbon dioxide in the opposite direction into oxygen chamber 12 and also into the capillary membranes 22.

The capillary membranes are preferably spirally disposed in the tubular membranes; this creates blood mixing in the tubular membranes causing the layer of oxygenated blood present on the inner walls of the tubular membranes to break thereby allowing complete oxygenation of blood. Furthermore, the fact that the capillary membranes are spirally disposed results in an increased oxygenating surface area.

When the diffusion device 10 is used to function as an artificial kidney, its structure and operation are substantially the same as that of a blood oxygenator. However, the fluid circulating through the capillary membranes 22 and in the closed chamber 12, may be for example, plasma, serum or a special mixture of serum or a mixture of various substances, such as sodium, calcium and potassium solutions. In this particular embodiment, blood still circulates in countercurrent flow in the tubular membranes 16.

EXAMPLE

Satisfactory results have been obtained from a blood oxygenator made in accordance with the present invention that included, in each tubular membrane, eleven spirally disposed capillary silastic membranes 30 cm long, with an outside diameter of 0.063 cm and an inside diameter of 0.03 cm. There were forty tubular silastic membranes in the 3 cm diameter chamber, each 24 cm long and having an outside diameter of 0.38 cm and an inside diameter of 0.333 cm. This artificial lung offered an oxygenating surface area of 0.244 square meters.

Although the invention has been described above in relation to one specific form, it will be evident to the man skilled in the art that it may be refined in various ways. For example, the construction of the manifolds at opposite ends of the central body 11 of the housing may be improved somewhat, although performing the same functions. It is therefore wished to have it understood that the present invention is not limited in interpretation except by the terms of the following claims.

I claim:

1. A membrane fluid diffusion exchange device comprising: a housing defining a closed chamber therein; a plurality of tubular diffusing membranes extending through said chamber; first inlet and outlet means opening in said chamber for circulating a treating fluid therein over the external surfaces of said tubular membranes; second inlet and outlet means provided in said housing for circulating in said tubular membranes a fluid to be treated; a plurality of capillary diffusing membranes disposed in each of said tubular membranes; and third inlet and outlet means provided in said housing for circulating a similar treating fluid in said capillary membranes; said treating fluid diffusing through the walls of said tubular membranes and said capillary membranes to treat said fluid circulating in said tubular membranes.

2. A device as defined in claim 1 wherein said treating fluid is oxygen and further including a source thereof.

3. A device as defined in claim 1 wherein said treating fluid is blood plasma or blood serum and further including a source thereof.

4. A device as defined in claim 1 wherein said tubular membranes and capillary membranes are arranged so that the circulation of said fluid to be treated in said tubular membranes is in a direction opposite to the circulation of said treating fluid in said capillary membranes.

5. A device as defined in claim 4 wherein said closed chamber and said tubular membranes are arranged so that the circulation of said treating fluid from said first inlet means to said first outlet means is in a direction opposite to the circulation of said fluid to be treated in the tubular membranes.

6. A blood oxygenator comprising: an elongated housing defining therein a closed chamber having a first end and a second end; a plurality of tubular diffusing membranes extending through said chamber from said first end to said second end; first inlet and outlet means opening in said chamber for circulating oxygen therein over the external surfaces of said tubular membranes; second inlet and outlet means disposed respectively in the vicinity of said first and second ends of said chamber for circulating through said tubular membranes the blood to be oxygenated; a plurality of capillary diffusing membranes disposed in each of said tubular membranes; and third inlet and outlet means disposed respectively in the vicinity of said second and first ends of said chamber for circulating oxygen in said capillary membranes, whereby oxygen is allowed to diffuse through the walls of said tubular membranes and said capillary membranes into the blood circulating through said tubular membranes and whereby carbon dioxide is allowed to diffuse from the blood through the walls of said tubular membranes and said capillary membranes into the oxygen passing therein.

7. A blood oxygenator as defined in claim 6 wherein the capillary membranes extend spirally in said tubular membranes.

8. A blood oxygenator as defined in claim 6 wherein said first inlet means is mounted to said housing adjacent said second end of said chamber, and wherein said first outlet means is mounted to said housing adjacent said first end of said chamber.

9. A blood oxygenator as defined in claim 6 further comprising collar means at said first end and said second end of said chamber supporting said tubular membranes in substantially parallel relationship in said chamber and sealing said closed chamber.

10. A blood oxygenator as defined in claim 6 wherein said tubular membranes and said capillary membranes are silastic membranes.

11. A blood oxygenator as defined in claim 6 wherein said housing includes a first manifold mounted in the vicinity of said first end of said chamber for receiving the blood from an artery and conducting the blood into one end of each of said tubular membranes, and a second manifold mounted adjacent said second end of said chamber for receiving the blood from the other end of each of the tubular membranes and returning the blood to a vessel.

12. A blood oxygenator as defined in claim 11 wherein said third inlet means is disposed to pass oxygen from an outside source thereof into said second manifold and thereby conduct the oxygen into one end of each of the capillary membranes; and wherein said third outlet means is disposed to receive the oxygen from via the first manifold the other end of each of the capillary membranes to return it to the outside source.

* * * * *